(12) United States Patent
Tao et al.

(10) Patent No.: US 8,166,629 B2
(45) Date of Patent: May 1, 2012

(54) METHOD FOR MANUFACTURING A STATOR

(75) Inventors: Yoshitaka Tao, Toyohashi (JP); Tetsuji Yoshikawa, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 13/234,345

(22) Filed: Sep. 16, 2011

(65) Prior Publication Data

US 2012/0005881 A1    Jan. 12, 2012

Related U.S. Application Data

(62) Division of application No. 12/483,819, filed on Jun. 12, 2009, now Pat. No. 8,072,112.

(30) Foreign Application Priority Data

Jun. 16, 2008   (JP) .................................. 2008-156570
Sep. 16, 2008   (JP) .................................. 2008-236734

(51) Int. Cl.
    *H02K 15/00*      (2006.01)
(52) U.S. Cl. ......................................... 29/596; 310/179
(58) Field of Classification Search .................... 29/596; 310/179, 79, 198, 184
    See application file for complete search history.

(56) References Cited

U.S. PATENT DOCUMENTS

| 7,650,682 | B2 * | 1/2010 | Sugishima et al. | ............. 29/596 |
| 7,763,998 | B2 * | 7/2010 | Makino et al. | .................. 310/71 |
| 8,072,112 | B2 * | 12/2011 | Tao et al. | ...................... 310/179 |
| 2009/0256438 | A1 * | 10/2009 | Ikeda et al. | ..................... 310/71 |

FOREIGN PATENT DOCUMENTS

| JP | 11-018345 A | | 1/1999 |
| JP | 2002-176753 | * | 6/2002 |
| JP | 2006-136089 | * | 5/2006 |

* cited by examiner

*Primary Examiner* — Nguyen N Hanh
(74) *Attorney, Agent, or Firm* — March Fischmann & Breyfogle LLP

(57) ABSTRACT

A stator having a stator core and coils is disclosed. The stator core includes split core pieces each having a tooth portion. The split core pieces are arranged annularly such that the distal ends of the tooth portions face radially inward. A lead wire is continuously wound about an adjacent pair of the tooth portions such that coils of different phases are formed in the circumferentially adjacent tooth portions, so that a plurality of connecting wires are provided, each connecting wire connecting coils of different phases. The connecting wires are connected to one another while being connected to one another, such that a neutral point is created.

9 Claims, 10 Drawing Sheets

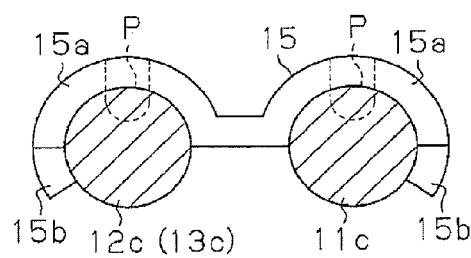
Fig.5A
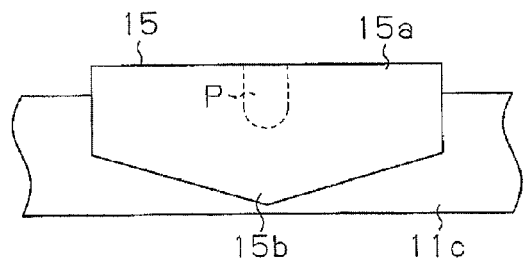
Fig.5B
Fig.6
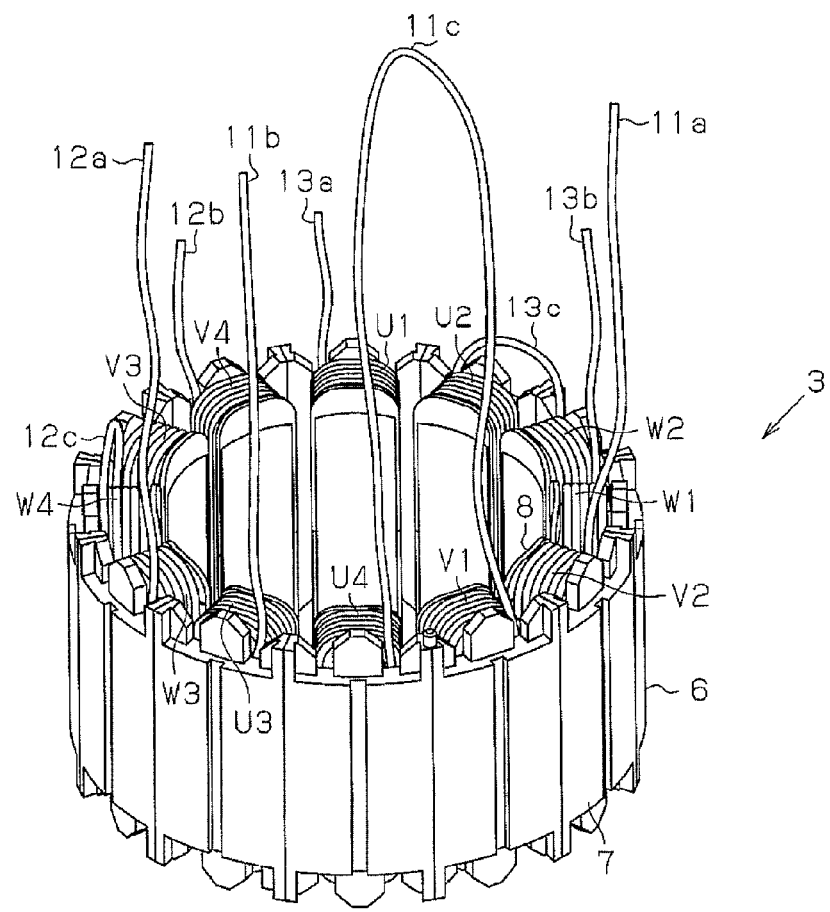

METHOD FOR MANUFACTURING A STATOR

RELATED APPLICATIONS

This application claims priority as a Divisional application of U.S. patent application Ser. No. 12/483,819, filed Jun. 12, 2009, entitled "MOTOR, STATOR, AND METHOD FOR MANUFACTURING STATOR", which claims priority to Japanese Patent Application No. 2008-156570 filed Jun. 16, 2008 and to Japanese Patent Application No. 2008-238734 filed Sep. 16, 2008. The contents of each of the foregoing is hereby incorporated by reference.

FILED OF THE INVENTION

The present invention relates to a method for manufacturing a stator.

BACKGROUND OF THE INVENTION

Conventionally, the stator of an inner rotor type motor has an annular stator core and coils. The stator core has tooth portions extending radially on the radially inner side of the stator, and the coils are wound about the tooth portions. Japanese Laid-Open Patent Publication No. 11-18345 discloses a stator having a split core that is divided into pieces each corresponding to one tooth portion. A stator having a split core is spread flat when coils are wound about the tooth portions. Then, the split core pieces are annularly arranged such that the tooth portions are oriented radially inward, so that the stator is formed. In a stator having a split core, coils are wound about tooth portions with the stator being spread flat. This increases the space factor of the coils.

In the stator disclosed in Japanese Laid-Open Patent Publication No. 11-18345, a single lead wire is wound about each tooth portion. However, in the stator of Japanese Laid-Open Patent Publication No. 11-18345, both ends of every coil (lead wire) need to be connected to a predetermined conductive member, which complicates the wire connecting procedure.

As a technique for remedying the above drawback, the stator disclosed by Japanese Laid-Open Patent Publication No. 2002-176753 has a configuration in which a plurality of coils of the same phase are formed by a single lead wire, and a connecting wire extends between the coils. Each lead wire that constitutes the coils of one phase is connected at one end to a common neutral point, and receives at the other end the supply of alternating current of a 120 degree phase difference. Since this structure allows the number of the lead wires forming the coils to be less than the number of the tooth portions, the number of manufacturing steps for the lead wire connecting procedure of the ends of the wires is reduced.

However, in the stator of Japanese Laid-Open Patent Publication No. 2002-176753, coils of the same phase are arranged in the circumferential direction with a coil of another phase in between. This makes the connecting wire between the coils of the same phase relatively long. Therefore, in a circularization process of the stator and a connecting process that is performed after the circularization process to connect connecting wires, the connecting wires are likely to get entangled, making these processes troublesome. Also, in a stator having a split core, the stator is made annular from a spread flat state after coils are wound about the tooth portions. The length of each connecting wire therefore needs to have a sufficient margin. In other words, the length of the connecting wires needs to be set relatively long.

SUMMARY OF THE INVENTION

Accordingly, it is an objective of the present invention to provide a motor, a stator, and a method for manufacturing a stator that shorten the length of wires and prevent connecting wires from getting entangled.

To achieve the foregoing objective and in accordance with a first aspect of the present invention, a stator including a stator core and a plurality of coils is provided. The stator core includes a plurality of split core pieces each having a tooth portion. The split core pieces are annularly arranged such that distal ends of the tooth portions face radially inward. Each of the coils is wound about one of the tooth portions, the coils are divided into groups of n phases. A lead wire is continuously wound about an adjacent pair of the tooth portions such that coils of different phases are formed in the circumferentially adjacent tooth portions, so that a plurality of connecting wires are provided. Each connecting wire connects coils of different phases. Either the connecting wires are connected to each other or the connecting wires are connected to each other in a state where at least one of the connecting wires is cut, such that a neutral point is created.

In accordance with a second aspect of the present invention, a motor having an annular stator fixed to an inner circumferential surface of a cylinder shaped like a bottomed cylinder, a rotor rotatably arranged inside the stator, and a holder member located at an opening of the housing is provided. The holder member covers one end of the stator in the axial direction. The stator includes a stator core and a plurality of coils. The stator core has a plurality of split core pieces each having a plurality of tooth portions. The split core pieces are annularly arranged such that distal ends of the tooth portions face radially inward. The coils are each wound about one of the tooth portions and include a U-phase coil, a V-phase coil, and a W-phase coil. A lead wire is continuously wound about an adjacent pair of the tooth portions such that coils of different phases are formed in the circumferentially adjacent tooth portions, so that a plurality of connecting wires are provided. Each connecting wire connects coils of different phases. Either the connecting wires are connected to each other or the connecting wires are connected to each other in a state where at least one of the connecting wires is cut, such that a neutral point is created. The connecting wires include a U-phase-to-V-phase connecting wire connecting the U-phase coil and the V-phase coil, a V-phase-to-W-phase connecting wire connecting the V-phase coil and the W-phase coil, and a W-phase-to-U-phase connecting wire connecting the W-phase coil and the U-phase coil. At least one of the connecting wires is formed into a ring along the circumferential direction of the stator.

In accordance with a third aspect of the present invention, a method for manufacturing a stator is provided. The stator has a stator core and a plurality of coils. The stator core includes a plurality of split core pieces each having a tooth portion. The split core pieces are annularly arranged such that distal ends of the tooth portions face radially inward. The coils are each wound about one of the tooth portions, and are divided into groups of n phases. The method includes: winding a lead wire about each adjacent pair of the tooth portions with the tooth portions are spread such that the distal ends of the tooth portions are separated from on another, such that coils of different phases are provided on each adjacent pair of the tooth portions, wherein a connecting wire connects the coils of the different phases; making the spread stator core have an annular shape such that the distal ends of the tooth portions face radially inward; and connecting the connecting wires, each of which connects coils of different phases wound about circumferentially adjacent tooth portions, to each other.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is a cross-sectional view for explaining a joint portion of connecting wires;

FIG. 5B is a side view for explaining a joint portion of connecting wires;

FIG. 6 is a perspective view illustrating the stator after a circularization process;

DESCRIPTION OF THE PREFERRED EMBODIMENTS

Hereinafter, a preferred embodiment according to the present invention will be described.

Figure 1A:
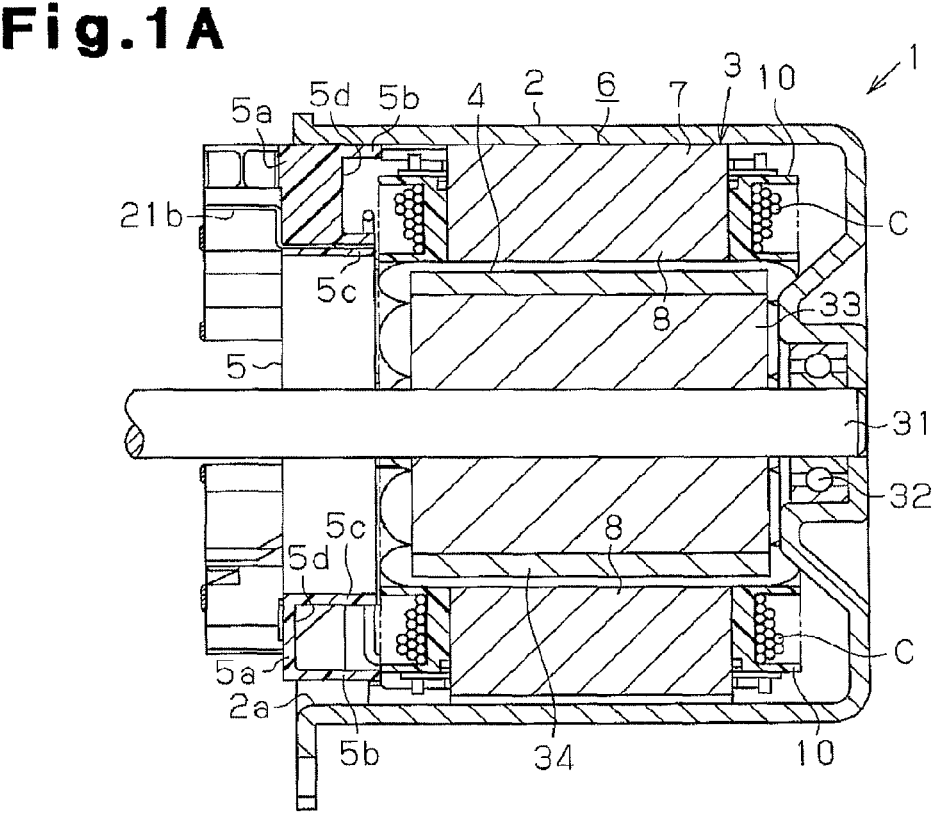
FIG. 1A is a cross-sectional view of a brushless motor according to one embodiment.
Figure 1B:
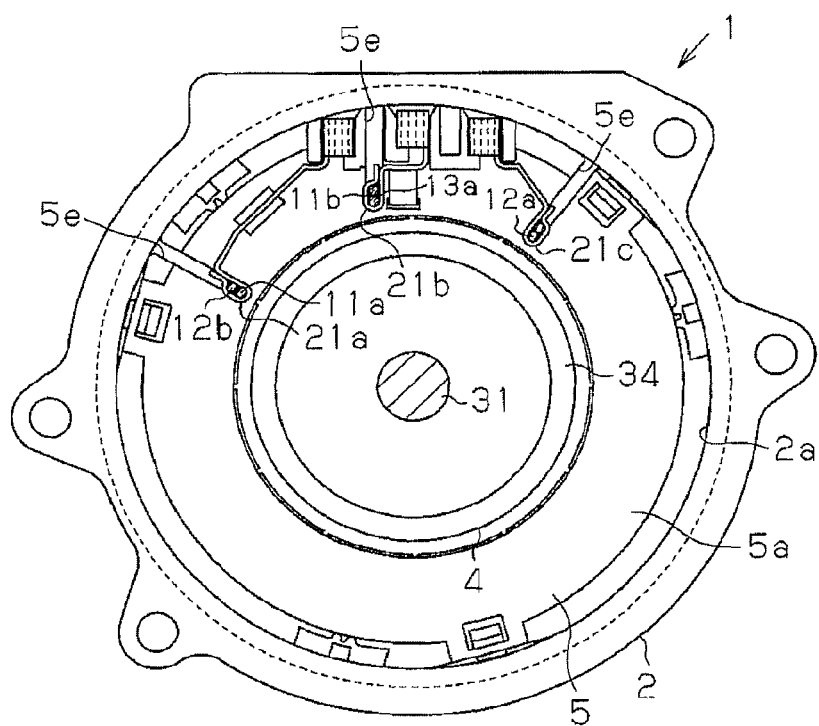
FIG. 1B is a plane view of the brushless motor of FIG. 1A.

A brushless motor 1 shown in FIGS. 1A and 1B is used as a drive source of a power steering apparatus that assists the operation of a vehicle steering shaft coupled to a vehicle steering wheel (not shown). As shown in FIGS. 1A and 1B, the motor 1 has a housing 2 shaped as a bottomed cylinder, and a substantially cylindrical stator 3 is fixed to the inner circumferential surface of the housing 2. The rotor 4 is rotatably arranged in the stator 3. The rotor 4 is coupled to the unillustrated vehicle steering shaft. A holder member 5, which is made of insulating synthetic resin, is fixed to an end of the housing 2 of the stator 3 at an opening 2a. The holder member 5 covers one end of the stator 3 in the axial direction.

Figure 2A:
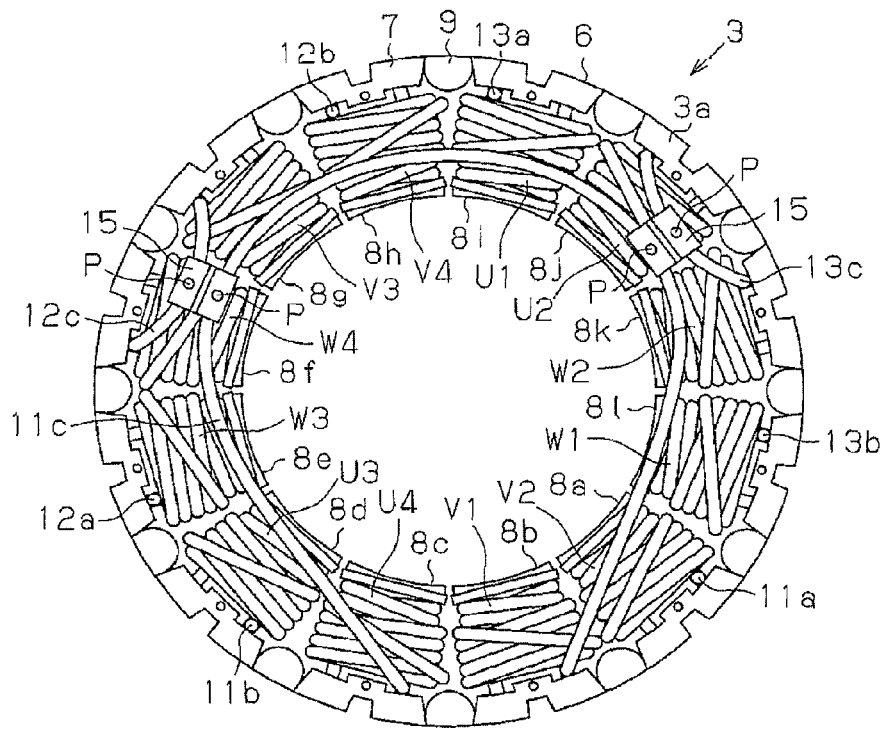
FIG. 2A is a plan view of a stator of the present embodiment.

As shown in FIG. 2A, a stator core 6 of the stator 3 includes a plurality of annularly arranged split core pieces 7 and coupling members 9 each of which couples the radially outer ends of a circumferentially adjacent pair of the split core pieces 7. The stator core 6 is substantially annular. In the present embodiment, the number of the split core pieces 7 is twelve. Each split core piece 7 has a tooth portion 8 that extends radially inward in the stator 3. The tooth portions 8 are arranged at equal intervals in the circumferential direction. In the present embodiment, the tooth portions 8 are provided every 30°. For purposes of illustration, a tooth portion 8 at a bottom right position of the stator 3 shown in FIG. 2A is expressed by reference numeral 8a, and the tooth portions 8 arranged clockwise from the tooth portion 8a is successively given reference numerals 8b to 8l.

Figure 2B:
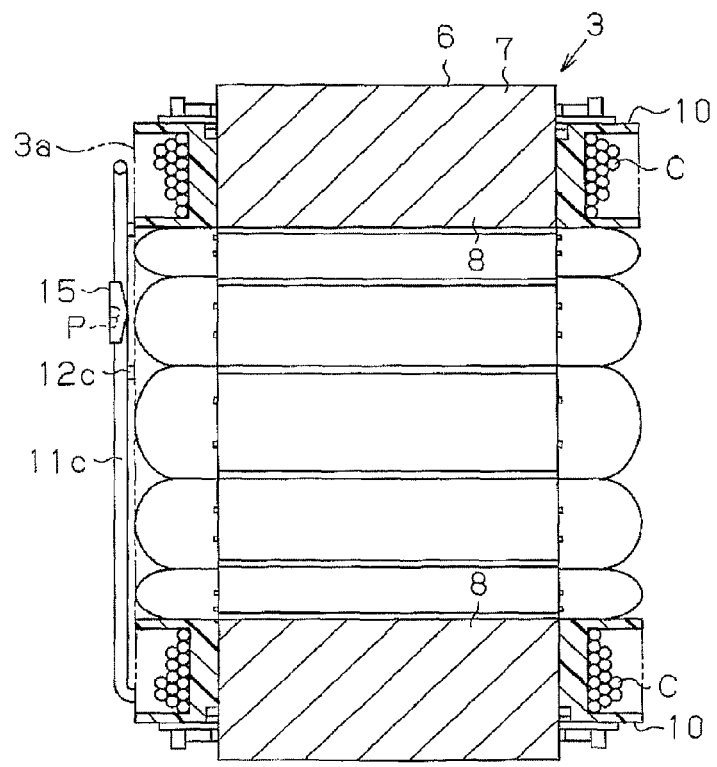
FIG. 2B is a cross-sectional view of the stator.

As shown in FIG. 2B, a bobbin 10 is attached to each of the tooth portions 8a to 8l, to cover the ends in the axial direction and the sides in the circumferential direction. A coil C is wound about each bobbin 10. The coils C are divided into four U-phase coils U1 to U4, four V-phase coils V1 to V4, and four W-phase coils W1 to W4 in correspondence with three drive currents of supplied in three-phases (U-phase, V-phase, and W-phase).

Two of the four coils in each single phase are wound about circumferentially adjacent two tooth portions 8, respectively. The other two coils are wound about two tooth portions 8, each spaced by 180° from one of the first two coils. Specifically, the V-phase coils, V2, V1, the U-phase coils U4, U3, the W-phase coils W3, W4, the V-phase coils V3, V4, the U-phase coils U1, U2, and the W-phase coils W2, W1 are sequentially wound about the tooth portions 8a to 8l, respectively, in the clockwise direction.

Figure 4:
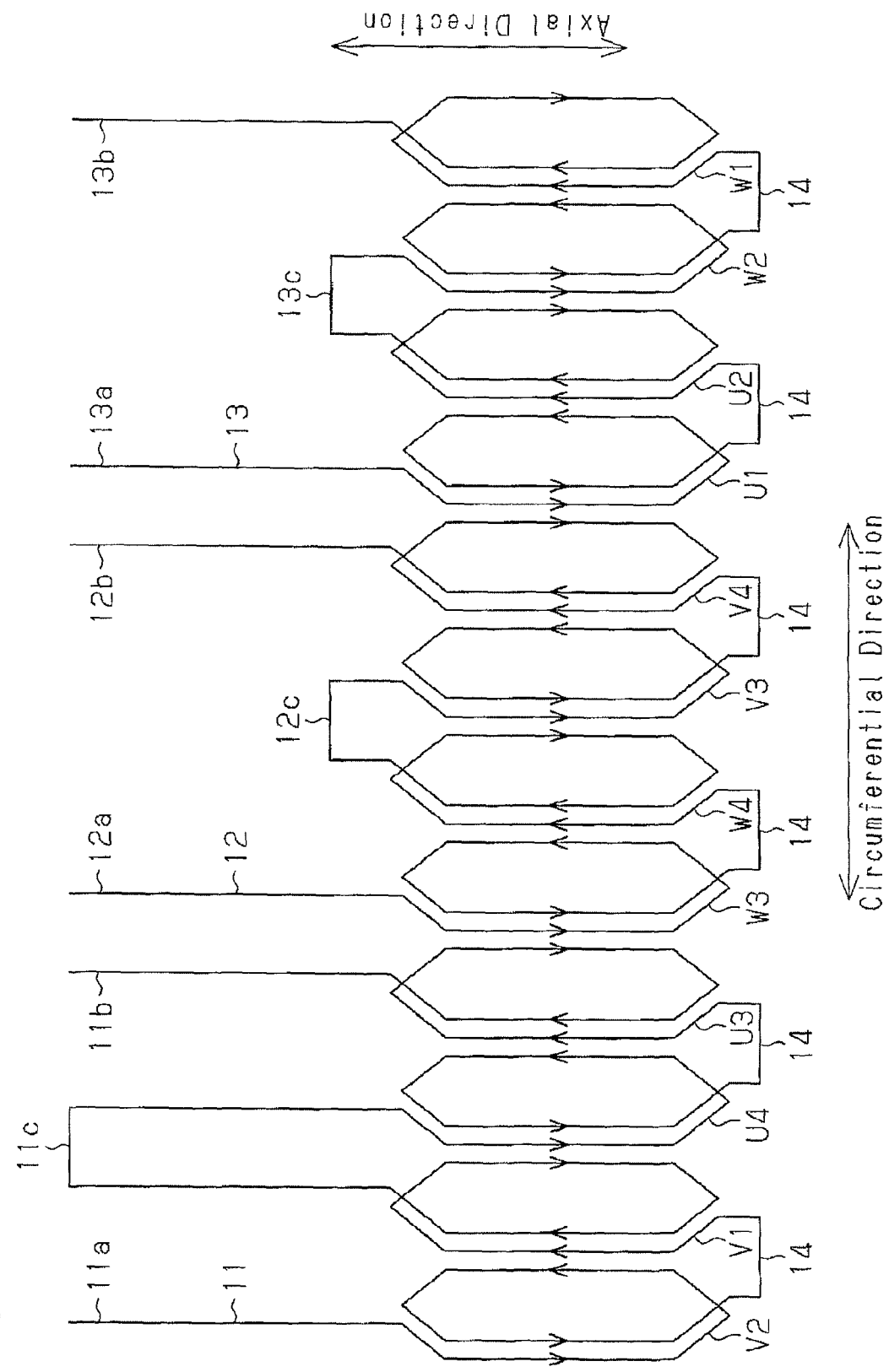
FIG. 4 is a wiring diagram of coils.

The twelve coils U1 to W4 are formed by three lead wires wound about the tooth portions 8 by way of concentrated winding, that is, a first lead wire 11, a second lead wire 12, and a third lead wire 13. FIG. 4 is a wiring diagram schematically showing the manner in which the first to third lead wires 11 to 13 are wound. In FIG. 4, the coils C are shown in the order from the left from the V-phase coil V2 to the W-phase coil W1. As shown in FIG. 4, the first lead wire 11 forms the V-phase coils V2, V1 and the U-phase coils U4, U3, the second lead wire 12 forms the W-phase coils W3, W4 and the V-phase coils V3, V4, and the third lead wire 13 forms the U-phase coils U1, U2 and the W-phase coils W2, W1. That is, each of the first to third lead wires 11 to 13 is wound about circumferentially consecutive four of the tooth portions 8. As shown in FIG. 5A, each of the lead wires 11 to 13 is a metal wire coated with insulating coating, and has a circular cross-section. In the present embodiment, the lead wires 11 to 13 are formed of copper.

The first lead wire 11 is wound in a forward direction about the tooth portion 8a (in the present embodiment, wound counterclockwise when viewed from the distal end of the tooth portion 8a, that is, when viewed from the inner end in the radial direction). The first lead wire 11 is drawn to the tooth portion 8b, which is adjacent to the tooth portion 8a, and is wound in a reverse direction about the tooth portion 8b (in this present embodiment, wound clockwise when viewed from the distal end of the tooth portion 8b, that is, when viewed from the inner end in the radial direction. In this manner, the V-phase coils V2, V1 are wound about the tooth portions 8a, 8b, respectively. The head of the first lead wire 11 extends from the V-phase coil V2 toward the holder member 5. A part of the first lead wire 11 that extends from the V-phase coil V2 forms a first V-phase power line 11a. A same phase connecting wire 14 extending between the V-phase coil V1 and the V-phase coil V2 is formed at an end of the stator 3 opposite from the holder member 5.

Also, the first lead wire 11 is drawn from the tooth portion 8b to the adjacent tooth portion 8c to be wound in the forward direction about the tooth portion 8c, and drawn to the adjacent tooth portion 8d to be wound in the reverse direction about the tooth portion 8d. In this manner, the U-phase coils U4, U3 are wound about the tooth portions 8c, 8d, respectively. The tail of the first lead wire 11 extends from the U-phase coil U3 in the same direction as the first V-phase power line 11a, that is, extends toward the holder member 5. The tail of the first lead wire 11 forms a first U-phase power line 11b. A U-phase-to-V-phase connecting wire 11c (a drawn wire) extending between the V-phase coil V1 and the adjacent U-phase coil U4 extends in the same direction as the first V-phase power line 11a and the first U-phase power line 11b. A same phase connecting wire 14 extending between the U-phase coil U4 and the U-phase coil U3 is formed at an end of the stator 3 opposite from the U-phase-to-V-phase connecting wire 11c, that is, from the holder member 5 in the stator 3.

Figure 3:
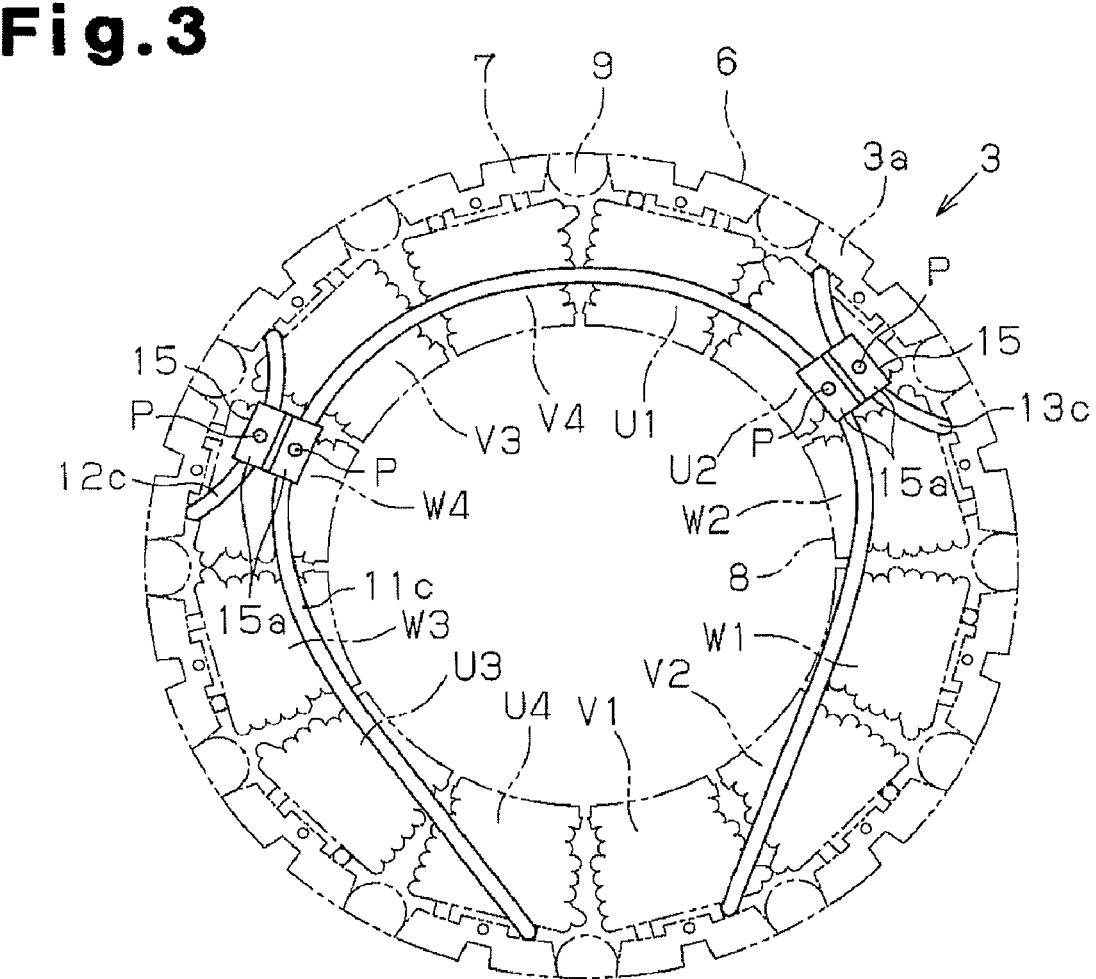
FIG. 3 is a diagrammatic plan view for explaining a connecting wire between different phases.

The second lead wire 12 is wound about the tooth portions 8e to 8h substantially in the same manner as the first lead wire 11. The second lead wire 12 forms the W-phase coils W3, W4 and the V-phase coils V3, V4 wound about the tooth portions 8e to 8h. The length of a V-phase-to-W-phase connecting wire 12c (a drawn wire) between the W-phase coil W4 and the adjacent V-phase coil V3 is shorter than that of the U-phase-to-V-phase connecting wire 11c. As shown in FIG. 3, the V-phase-to-W-phase connecting wire 12c is arched to be slightly separated from an end face 3a in the axial direction of the stator 3.

The third lead wire 13 is wound about the tooth portions 8i to 8l in the same manner as the second lead wire 12. The third lead wire 13 forms the U-phase coils U1, U2 and the W-phase coils W2, W1 wound about the tooth portions 8i to 8l. That is, the length of a W-phase-to-U-phase connecting wire 13c (a drawn wire) between the U-phase coil U2 and the adjacent W-phase coil W2 is equal to that of the V-phase-to-W-phase connecting wire 12c of the second lead wire 12. The W-phase-to-U-phase connecting wire 13c is also arched to be slightly separated from the axial end face 3a of the stator 3.

As shown in FIG. 2B, the U-phase-to-V-phase connecting wire 11c of the first lead wire 11 is bent substantially at a right angle in a proximal portion close to the V-phase coil V1 and the U-phase coil U4, and extends along the axial end face 3a of the stator 3. That is, the U-phase-to-V-phase connecting wire 11c is bent to be substantially parallel with the axial end face 3a of the stator 3. As shown in FIG. 3, the U-phase-to-V-phase connecting wire 11c conforms to the annular shape of the stator 3, or extends along the circumferential direction of the stator 3. The U-phase-to-V-phase connecting wire 11c is formed into a ring having a diameter that is not smaller than the inner diameter and not greater than the outer diameter of the stator 3. The thus configured U-phase-to-V-phase connecting wire 11c has a required minimum length for being connected to the V-phase-to-W-phase connecting wire 12c and to the W-phase-to-U-phase connecting wire 13c. The U-phase-to-V-phase connecting wire 11c is connected to the V-phase-to-W-phase connecting wire 12c and the W-phase-to-U-phase connecting wire 13c by connecting members 15. The V-phase-to-W-phase connecting wire 12c and the W-phase-to-U-phase connecting wire 13c each have a sufficient length for being connected to the U-phase-to-V-phase connecting wire 11c, and is formed to extend substantially parallel with the axial end face 3a of the stator 3.

As shown in FIGS. 5A and 5B, each connecting member 15 is formed by pressing a metal plate. Each connecting member 15 has integrally formed two arcuate portions 15a, which can be brought into an area contact with the surfaces of the connecting wires 11c, 12c, 13c. Each arcuate portion 15a has a semicircular cross section. A retaining claw 15b is formed at the open end of each arcuate portion 15a in the circumferential direction. Each retaining claw 15b serves as a retaining portion that projects in the circumferential direction. The U-phase-to-V-phase connecting wire 11c is fitted in one of the two arcuate portions 15a, and the V-phase-to-W-phase connecting wire 12c or the W-phase-to-U-phase connecting wire 13c is fitted in the other arcuate portion 15a. The U-phase-to-V-phase connecting wire 11c is electrically connected to the V-phase-to-W-phase connecting wire 12c and the W-phase-to-U-phase connecting wire 13c by the connecting members 15, so that neutral points is created. The retaining claws 15b prevent the connecting wires 11c, 12c, 13c from separating from the arcuate portions 15a.

As shown in FIGS. 1A and 1B, the holder member 5 includes an outer cylindrical portion 5b and an inner cylindrical portion 5c. The outer cylindrical portion 5b extends axially from an annular bottom portion 5a of the holder member 5 and is fixed to the inner circumferential surface of the housing 2. The inner cylindrical portion 5c extends in a position radially inside of the outer cylindrical portion 5b. An accommodation recess 5d extending along the axial direction is defined between the outer cylindrical portion 5b and the inner cylindrical portion 5c. The accommodation recess 5d accommodates the U-phase-to-V-phase connecting wire 11c, the V-phase-to-W-phase connecting wire 12c, and the W-phase-to-U-phase connecting wire 13c, which are connected to one another. The holder member 5 also has three incisions 5e extending in the radial direction. Each incision 5e holds one of feed terminals 21a, 21b, 21c each corresponding to one of the drive currents of three phases.

The first V-phase power line 11a drawn from the V-phase coil V2 extends along the circumferential direction of the stator 3 until it reaches a second V-phase power line 12b drawn from the V-phase coil V4 (the tail of the second lead wire 12). As shown in FIG. 1B, each of the V-phase power lines 11a, 12b is electrically connected to the feed terminal 21a, for example, by TIG welding. The first U-phase power line 11b drawn from the U-phase coil U3 (the tail of the first lead wire 11) extends along the circumferential direction of the stator 3 until it reaches a second U-phase power line 13a drawn from the U-phase coil U1 (the head of the third lead wire 13). As shown in FIG. 1B, each of the U-phase power lines 11b, 13a is electrically connected to the feed terminal 21b, for example, by TIG welding. A first W-phase power line 12a drawn from the W-phase coil W3 (the head of the second lead wire 12) and a second W-phase power line 13b drawn from the W-phase coil W1 (the tail of the third lead wire 13) each extend until it reaches a position slightly closer to the U-phase coil U1 than the U-phase coil U2. The W-phase power line 12a, 13b are each electrically connected to the feed terminal 21c, for example, by TIG welding. Each of the power lines 11a to 13b receives drive current of the corresponding phase through the feed terminals 21a, 21b, 21c.

As shown in FIG. 1A, a rotary shaft 31 of the rotor 4 is supported by a pair of bearings 32 (only one is shown) provided in the housing 2. A cylindrical rotor core 33 is fixed to the rotary shaft 31, and a magnet 34 is fixed to the outer circumferential surface of the rotor core 33. The magnet 34 is polarized such that the polarity varies alternately (between north pole and south pole) every predetermined angle.

In the brushless motor 1 as described above, three drive currents having 120° degree phase differences are supplied to the coils U1 to W4 through the feed terminals 21a, 21b, 21c. Then, each of the coils U1 to W4 is excited to generate a rotating magnetic field in the stator, which in turn rotates the rotor 4.

The method for manufacturing the above described stator 3 will now be described.

First, the split core pieces 7 are linearly arranged to be parallel with the tooth portions 8, and the stator core 6 is spread flat. In this spread flat state, the split core pieces 7 are pivotally connected to each other at the radially outer ends by the coupling members 9. In the spread flat state, a winding process is executed, in which the coils U1 to W4 are wound about the tooth portions 8.

In the winding process, the first to third lead wires 11 to 13 are wound about the tooth portions 8 by way of concentrated winding in the manner described above, using a coil winding machine (not shown). The first lead wire 11 is wound about the tooth portions 8a to 8d. Then, the second lead wire 12 is wound about the tooth portions 8e to 8h. Thereafter, the third lead wire 13 is wound about the tooth portions 8i to 8l. At this time, the U-phase-to-V-phase connecting wire 11c is drawn to have a length sufficient for being connected to the V-phase-to-W-phase connecting wire 12c and to the W-phase-to-U-phase connecting wire 13c. Also, the V-phase-to-W-phase connecting wire 12c and the W-phase-to-U-phase connecting wire 13c are each arched to be slightly separated from the axial end face 3a of the stator 3 and caused to project from the axial end face 3a. In the winding process, the first to third lead wires 11 to 13 may be simultaneously wound about the tooth portions.

Then, a circularization process is executed, in which the spread flat stator 3 is rolled up such that the distal ends of the tooth portions 8a to 8l face radially inward. Through the circularization process, the stator 3 is in the state shown in FIG. 6. In the present embodiment, the connecting wires of the stator 3 (the phase-to-phase connecting wires 11c, 12c, 13c and the same phase connecting wire 14) all extend over an adjacent pair of the coils U1 to W4. Thus, the connecting wires can be made short. This configuration prevents the connecting wires from getting entangled in the circularization process. As a result, the circularization process of the stator 3 is facilitated.

A connecting wire forming process is then executed, in which the U-phase-to-V-phase connecting wire 11c is formed into a predetermined shape. In the connecting wire forming process, the U-phase-to-V-phase connecting wire 11c is formed into a ring along the circumferential direction of the stator 3. Thereafter, the U-phase-to-V-phase connecting wire 11c is bent substantially at a right angle to be substantially parallel with the axial end face 3a of the stator 3. In this process also, the connecting wires of the stator 3 all extend over an adjacent pair of the coils U1 to W4. This configuration prevents the connecting wires from getting entangled and thus facilitates the production of the U-phase-to-V-phase connecting wire 11c.

Figure 7A:
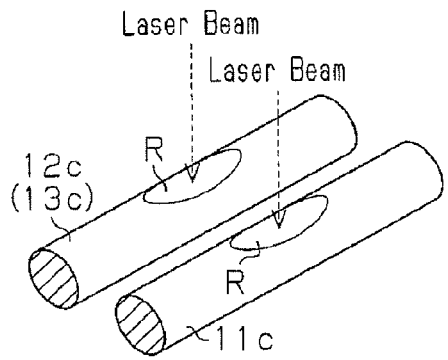
FIG. 7A is a perspective view showing a film removal process.

Next, a film removal process for removing films on predetermined parts of the connecting wires 11c, 12c, 13c is performed. As shown in FIG. 7A, in the film removal process, laser beam is radiated to the axial end face 3a of the stator 3 from a laser beam device (not shown), such that the laser beam is radiated to a portion of the connecting wires 11c, 12c, 13c on a side of the stator 3 opposite from the axial end face 3a. This removes the film on the parts of the connecting wires 11c, 12c, 13c to which the laser beam has been radiated, so that film free portions R are formed on the connecting wires 11c, 12c, 13c.

Figure 7B:
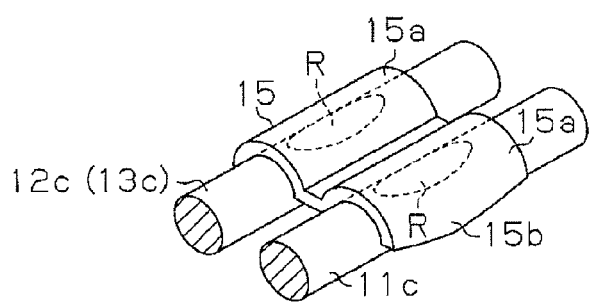
FIG. 7B is a perspective view showing a joining process.

Next, a joining process is executed, in which the connecting wires 11c, 12c, 13c are electrically connected to each other via the connecting members 15. In the joining process, each connecting member 15 is placed on the film free portions R of the corresponding pair of the connecting wires 11c, 12c, 13c as shown in FIG. 7B. At this time, the U-phase-to-V-phase connecting wire 11c is fitted in one of the two arcuate portions 15a of each connecting member 15, and the V-phase-to-W-phase connecting wire 12c or the W-phase-to-U-phase connecting wire 13c is fitted in the other arcuate portion 15a. This brings the inner surface of each arcuate portion 15a into area contact with the corresponding film free portion R.

Figure 7C:
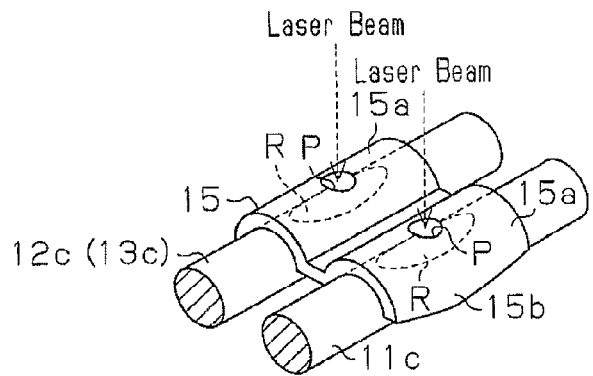
FIG. 7C is a perspective view showing the joining process.

Next, as shown in FIG. 7C, each connecting member 15 is joined to the corresponding pair of the connecting wires 11c, 12c, 13c by laser welding. In the welding process, the laser beam that is radiated toward the axial end face 3a of the stator 3 is radiated to the upper surface of the arcuate portions 15a. The laser beam forms a through hole in each arcuate portion 15a, so that the inner surface of the arcuate portion 15a is welded to the upper surface of the corresponding one of the connecting wires 11c, 12c, 13c. That is, a joint portion P at which each connecting member 15 is welded to the connecting wires 11c, 12c, 13c is formed in a position of the stator 3 opposite from the axial end face 3a (see FIGS. 2A, 2B, 5A, and 5B). In this manner, the U-phase-to-V-phase connecting wire 11c is electrically connected to the V-phase-to-W-phase connecting wire 12c and to the W-phase-to-U-phase connecting wire 13c.

The direction of radiation of the laser beam in the welding process is the same as the direction of radiation of the laser beam in the film removal process. It is therefore possible to use the same laser beam device used in the film removal process.

As described above, in the stator 3 of the present embodiment, the joint portion P between each connecting member 15 and the connecting wires 11c, 12c, 13c are formed at a position of the stator 3 opposite from the axial end face 3a. This allows the connecting wires 11c, 12c, 13c to be welded while being maintained parallel with the axial end face 3a of the stator 3. This eliminates the necessity for a process to extend the connecting wires 11c, 12c, 13c along the axial direction. Also, since the connecting wires 11c, 12c, 13c do not need to be welded while being extended, the joint between the connecting wires 11c, 12c, 13 via the connecting members 15 is facilitated. Since the connecting wires 11c, 12c, 13c are substantially parallel withy the axial end face 3a of the stator 3, the axial length of the entire stator 3 is reduced. Further, since the joint portions P do not face the coils C, the reliability of insulation between the connecting wires 11c, 12c, 13c and the coils C is improved.

After the joining process, the connecting wires 11c, 12c, 13c are arranged at the positions shown in FIG. 3. Then, the power lines 11a to 13b are formed to be in the above described state, and arranged at positions corresponding to the feed terminals 21a, 21b, 21c in the holder member 5. Thereafter, the power lines 11a to 13b are drawn to radially outside.

Then, the stator 3, which has been produced in the above described manner, is installed in the housing 2. Thereafter, the holder member 5 is assembled with the housing 2, so that the connecting wires 11c, 12c, 13c are accommodated in the accommodation recess 5d of the holder member 5. Then, each of the power lines 11a to 13b are passed through the corresponding incision 5e of the holder member 5, and is electrically connected to the feed terminal 21a to 21c of the corresponding phase.

The present embodiment has the following advantages.

(1) In the brushless motor 1 of the present embodiment, coils U1 to W4 of different phases are continuously wound about circumferentially adjacent ones of the tooth portions 8, and the U-phase-to-V-phase connecting wire 11c, the V-phase-to-W-phase connecting wire 12c, and the W-phase-to-U-phase connecting wire 13c are provided to connect the coils U1 to W4 of different phases. The connecting wires 11c, 12c, 13c are connected to each other to form the neutral points. Since each of the phase-to-phase connecting wires 11c, 12c, 13c is formed between circumferentially adjacent coils U1 to W4, the length of the connecting wires 11c, 12c, 13c are made short. Since the connecting wires are prevented from getting entangled in the circularization process of the stator 3 and the subsequent process for connecting the connecting wires, the stator 3 is easily produced. Since the first to third lead wires 11 to 13 do not need to be long, the configuration contributes to the reduction in the costs.

(2) In the present embodiment, the U-phase-to-V-phase connecting wire 11c is formed into a ring conforming to the annular shape of the stator 3. This allows the length of the phase-to-phase connecting wires 11c, 12c, 13c to be minimized. As a result, the connecting wires 11c, 12c, 13c are reliably prevented from getting entangled in the circularization process and the joining process.

(3) In the present embodiment, the connecting wires 11c, 12c, 13c are formed to be parallel with the axial end face 3a of the stator 3. The connecting wires 11c, 12c, 13c are joined to each other through the connecting members 15 by welding. The joint portions P between the connecting members 15 and the connecting wires 11c, 12c, 13c are located on part of the stator 3 opposite from the axial end face 3a. Therefore, the connecting wires 11c, 12c, 13c can be welded while being bent to be substantially parallel with the axial end face 3a of the stator 3. As a result, a process for extending the connecting wires 11c, 12c, 13c along the axial direction is unnecessary. Also, the connecting wires 11c, 12c, 13c do not need to be welded while being extended. This facilitates the joint of the connecting wires 11c, 12c, 13. Since the connecting wires 11c, 12c, 13c are substantially parallel Withy the axial end face 3a of the stator 3, the axial length of the entire stator 3 is reduced. Further, since the joint portions P are formed at part of the stator 3 opposite from the axial end face 3a, the joint portions P do not face the coils C, and the reliability of insulation between the connecting wires 11c, 12c, 13c and the coils C is improved.

(4) In the present embodiment, the connecting wires 11c, 12c, 13c are electrically connected to each other through the connecting members 15, and the joint portions P are formed between the connecting wires 11c, 12c, 13c and the connecting member 15. This reinforces the joint of connecting wires 11c, 12c, 13c.

(5) In the present embodiment, since the connecting members 15 have the arcuate portions 15a that are in area contact with and welded to the connecting wires 11c, 12c, 13c, the reliability of the joint between the connecting wires 11c, 12c, 13c and the connecting members 15 is improved.

(6) In the present embodiment, each connecting member 15 has retaining claws 15b, which prevent the connecting wires 11c, 12c, 13c from separating from the arcuate portions 15a.

(7) In the present embodiment, the connecting wires 11c, 12c, 13c are welded to the connecting members 15 by laser welding within a very short time. Thus, the thermal influence on parts about the connecting wires 11c, 12c, 13c, for example, members such as the coils C, is reduced. Since laser beam can be used to weld the connecting wires 11c, 12c, 13c to part of the stator 3 opposite from the axial end face 3a, the coils C, which are wound about tooth portions 8 located on the axial end face 3a of the stator 3, is not damaged. Accordingly, the coils C and the connecting wires 11c, 12c, 13c can be arranged to close to each other in the axial direction. This reduces the axial length of the stator 3. Further, when the laser welding is employed, no electrode needs to be placed between the coils C and the connecting wires 11c, 12c, 13c. This further reduces the axial length of the stator 3.

(8) Since the U-phase-to-V-phase connecting wire 11c is formed into a ring along the circumferential direction of the stator 3, the connecting wires 11c, 12c, 13c are easily joined together.

(9) In the present embodiment, the coils C are formed by metal wires coated with insulating coating, and the connecting wires 11c, 12c, 13c are parts the coated lad wire drawn out of the coils C. In the film removal process, laser beam is radiated onto parts of the connecting wires 11c, 12c, 13c opposite from the axial end face 3a of the stator 3, so that the film free portions R are formed. Thereafter, in the joining process, the film free portions R of the connecting wires 11c, 12c, 13c are welded to form the joint portions P. That is, the film on the coils C is removed in advance by radiating the laser beam thereon before the connecting wires 11c, 12c, 13c are welded to the connecting members 15. This improves the reliability of the electric connection at the joint portions P between the connecting members 15 and the connecting wires 11c, 12c, 13c. Also, subsequent to the film removal, laser beam is radiated from the same direction to weld the connecting wires 11c, 12c, 13c to the connecting members 15. Therefore, the laser facilities do not need to be moved and the number of manufacturing steps is reduced. As a result, it is possible to provide an inexpensive stator 3.

(10) In the present embodiment, since the U-phase-to-V-phase connecting wire 11c is formed into a ring along the circumferential direction of the stator 3, the connecting wires 11c, 12c, 13c are easily joined together. Since the length of the phase-to-phase connecting wires 11c, 12c, 13c can be minimized, the connecting wires 11c, 12c, 13c are more effectively prevented from getting entangled.

(11) In the present embodiment, when winding the coils C of different phases about adjacent ones of the tooth portions 8, the connecting wires 11c, 12c, 13c are arched and projected from the axial end face 3a of the stator 3. Therefore, the arched connecting wires 11c, 12c, 13c are easily formed, and an inexpensive stator 3 can be provided.

The above embodiment of the present invention may be modified as follows.

Figure 8:
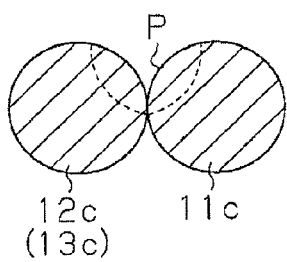
FIG. 8 is a cross-sectional view for explaining a manner in which connecting wires are joined according to a modified embodiment.
Figure 9:
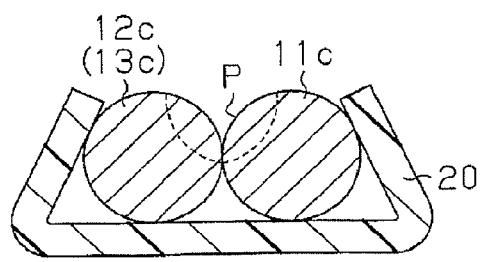
FIG. 9 is a cross-sectional view for explaining a manner in which connecting wires are joined according to a modified embodiment.

As shown in FIG. 8, the connecting wires 11c, 12c, 13c may be directly joined to each other. In this case, a holder 20 shown in FIG. 9 may be provided under the connecting wires 11c, 12c, 13c, that is, on the axial end face 3a of the stator 3. The holder 20 holds the joined connecting wires 11c, 12c, 13c. This structure improves the reliability of the joint between the connecting wires 11c, 12c, 13c.

Figure 10:
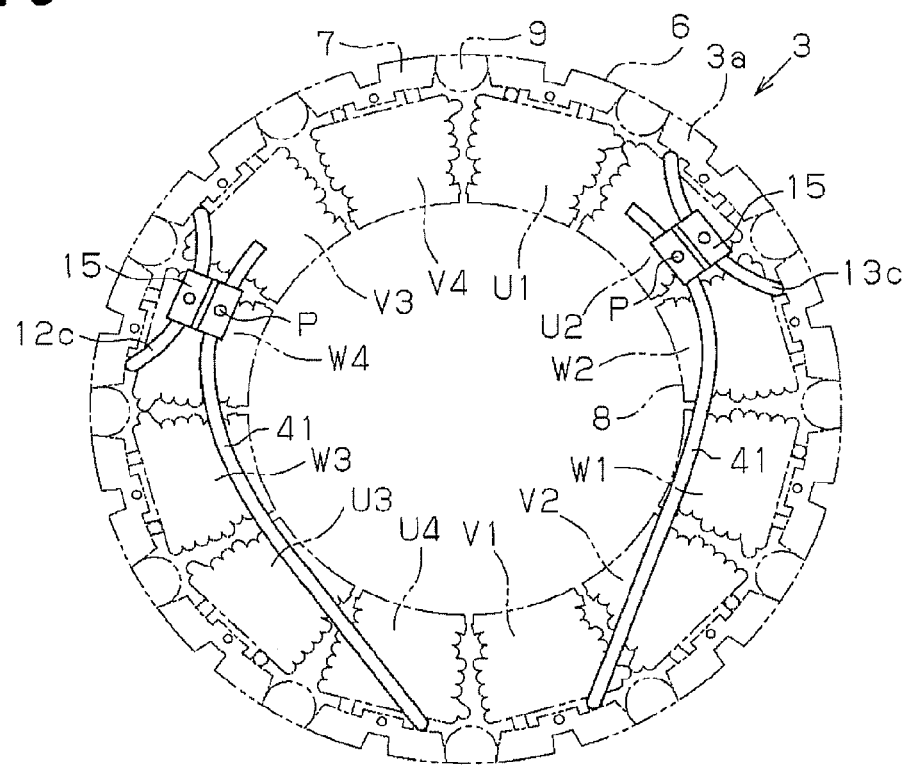
FIG. 10 is a diagrammatic plan view illustrating a stator according to a modified embodiment.

As shown in FIG. 10, two wire segments 41 may be provided by cutting the U-phase-to-V-phase connecting wire 11c. One of the wire segments 41 may be connected to the V-phase-to-W-phase connecting wire 12c, and the other may be connected to the W-phase-to-U-phase connecting wire 13c. The connecting wire that is cut may be any of the connecting wires 11c, 12c, 13c. Also, two or all of the connecting wires 11c, 12c, 13c may be cut. These structures further shorten the phase-to-phase connecting wires.

Figure 11:
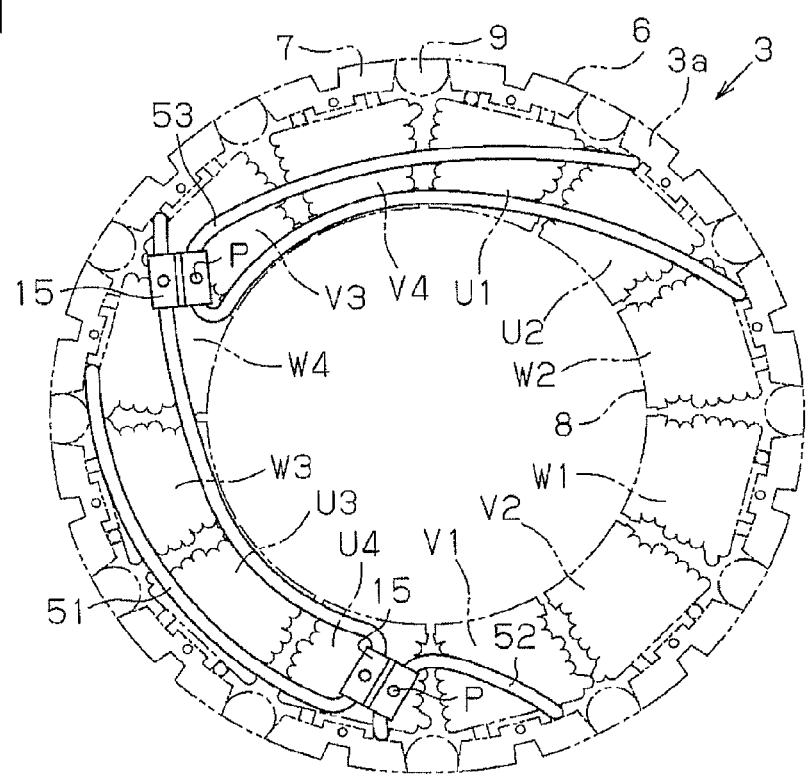
FIG. 11 is a diagrammatic plan view illustrating a stator according to a modified embodiment.

The manner in which the connecting wires 11c, 12c, 13c are connected is not limited to that disclosed in the above embodiment. For example, a V-phase-to-W-phase connecting wire 51 shown in FIG. 11 may be used. The V-phase-to-W-phase connecting wire 51 is arched and extends along the circumferential direction of the stator 3 to a U-phase-to-V-phase connecting wire 52. That is, a part drawn from the V-phase coil V3 and a part drawn from the W-phase coil W4 both extend along the circumferential direction of the stator 3. The V-phase-to-W-phase connecting wire 51 is connected to the U-phase-to-V-phase connecting wire 52 via the connecting members 15. An W-phase-to-U-phase connecting wire 53 is arched and entirely extends along the circumferential direction of the stator 3 to the V-phase-to-W-phase connecting wire 51. The W-phase-to-U-phase connecting wire 53 is connected to the V-phase-to-W-phase connecting wire 51 via the connecting members 15. This structure also shortens the circumferential measurement of the connecting wires 51, 52, 53, thereby preventing the connecting wires 51, 52, 53 from getting entangled. This facilitates the connection of the connecting wires 51, 52, 53.

Figure 12:
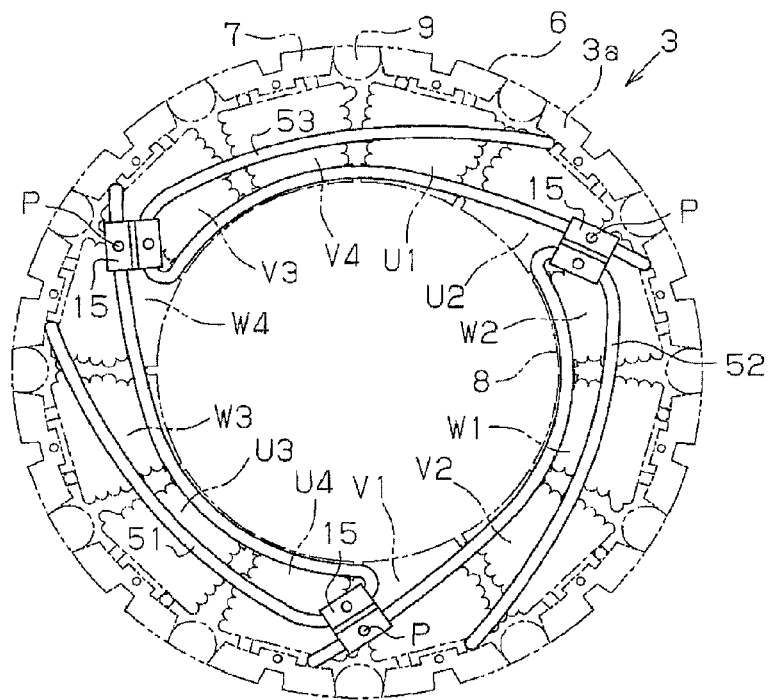
FIG. 12 is a diagrammatic plan view illustrating a stator according to a modified embodiment.
Figure 13:
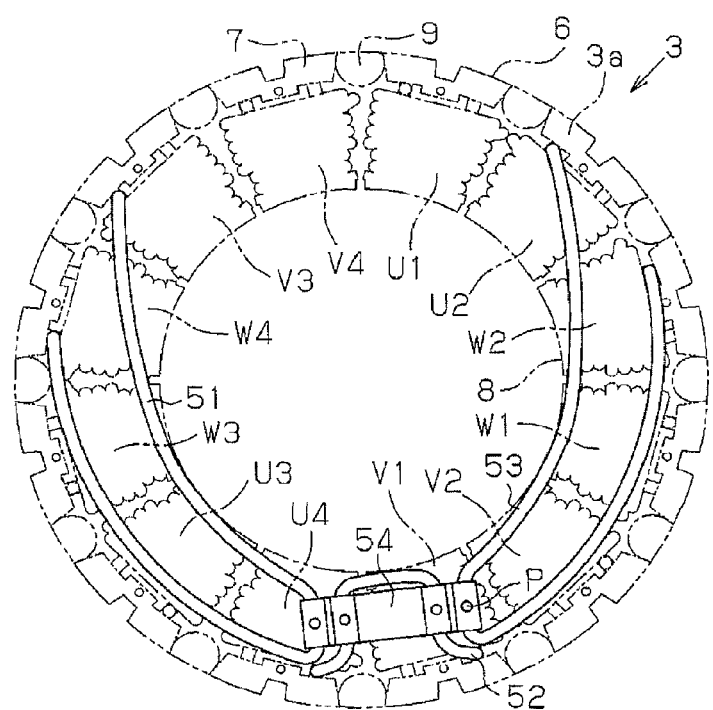
FIG. 13 is a diagrammatic plan view illustrating a stator according to a modified embodiment.

Like the V-phase-to-W-phase connecting wire 51 and the W-phase-to-U-phase connecting wire 53, the U-phase-to-V-phase connecting wire 52 may be arched and entirely extend along the circumferential direction of the stator 3 to the W-phase-to-U-phase connecting wire 53, and may be connected to the W-phase-to-U-phase connecting wire 53 as shown in FIG. 12. Also, as shown in FIG. 13, the W-phase-to-U-phase connecting wire 53 may be arched and entirely extend along the circumferential direction of the stator 3 to an U-phase-to-V-phase connecting wire 52, so as to be connected to the U-phase-to-V-phase connecting wire 52. The connecting wires 51, 52, 53 are connected to each other by connecting members 54. The structures shown in FIG. 12 and FIG. 13 facilitate the connection of the connecting wires 51, 52, 53. The structure shown in FIG. 13 reduces the number of components in a case where connecting wires are connected via connecting members.

Instead of the U-phase-to-V-phase connecting wire 11c, the V-phase-to-W-phase connecting wire 12c or the W-phase-to-U-phase connecting wire 13c may be formed into a ring along the circumferential direction of the stator 3. Also, in addition to the U-phase-to-V-phase connecting wire 11c, the V-phase-to-W-phase connecting wire 12c and the W-phase-to-U-phase connecting wire 13c may be formed into rings along the circumferential direction of the stator 3.

Figure 14:
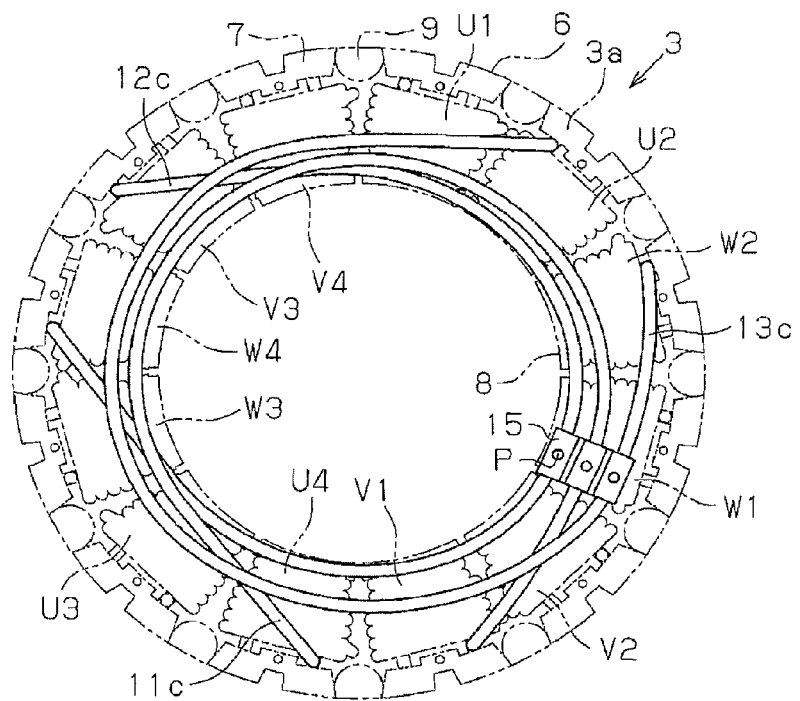
FIG. 14 is a diagrammatic plan view illustrating a stator according to a modified embodiment.
Figure 15:
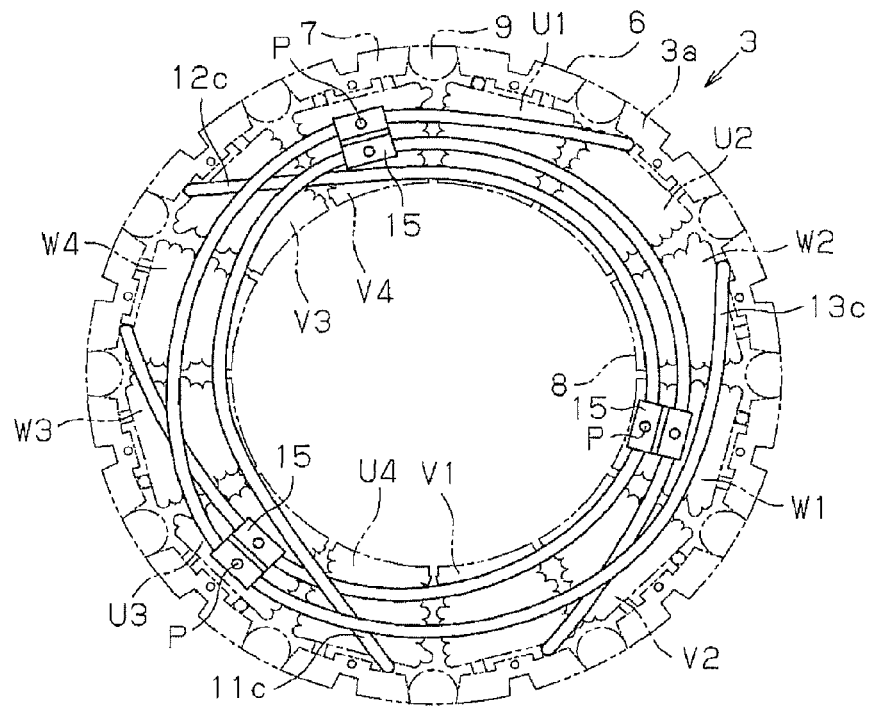
FIG. 15 is a diagrammatic plan view illustrating a stator according to a modified embodiment.

As shown in FIGS. 14 and 15, all of the connecting wires 11c, 12c, 13c may be formed into rings along the circumferential direction of the stator 3. In the stator 3 shown in FIG. 14, the connecting wires 11c, 12c, 13c are connected to each other by a single connecting member 15. In the stator 3 shown in FIG. 15, the connecting wires 11c, 12c, 13c are connected to each other by three connecting members 15. The structure shown in FIG. 14 reduces the number of components in a case where connecting wires are connected via connecting members.

In the above embodiment, the connecting wires 11c, 12c, 13c are arranged along the axial end face 3a of the stator 3 at the connection portions. However, the connecting wires 11c, 12c, 13c may be arranged along the axial direction of the stator 3.

In the above embodiment, the joint portions P are located in upper portions of the connecting wires 11c, 12c, 13c, that is, on a part of the stator 3 opposite from the axial end face 3a. However, the joint portions P may be located elsewhere. The joint portions P may be located on sides of the connecting wires 11c, 12c, 13c. In this case, laser beam is radiated along a direction perpendicular to the axial direction of the stator 3 toward the connecting wires 11c, 12c, 13c, so that the joint portions P are formed on the sides of the connecting wires 11c, 12c, 13c.

A through hole for welding may be formed in the arcuate portions 15a of each connecting member 15.

In the above embodiment, the film removal process may be omitted, and the film may be removed during the welding.

In the above embodiment, to improve the peel property of the film on the connecting wires 11c, 12c, 13c, laser absorption material (for example, carbon black) may be mixed in or applied to the surface of the connecting wires 11c, 12c, 13c.

The winding process may be executed with the split core pieces 7 are annularly arranged such that distal ends of the tooth portions 8a to 8l are directed axially outward.

In the above embodiment, the number of the split core pieces 7 forming the stator core 6 is twelve. However, the number of the split core pieces 7 is not limited to twelve, but may be less or more than twelve. The number of the coils is changed in correspondence with the number of the split core pieces. Instead of forming the stator core 6 by the split core pieces 7, the stator core may be formed as an integral body.

In the above embodiment, two coils in each of the coil groups, or the U-phase coils U1 to U4, the V-phase coils V1 to V4, and the W-phase coils W1 to W4, are wound about two tooth portions 8 adjacent to each other in the circumferential direction of the stator 3, and the remaining two coils are wound about two tooth portions 8 spaced by 180° from one of the first two coils. This configuration may be changed. For example, the four coils of each phase may be wound about tooth portions 8 such that the four coils are arranged at 90 degree intervals.

In the above embodiment, the same phase connecting wires 14 are formed on an end face of the stator 3 opposite from the end face on which the phase-to-phase connecting wires 11c, 12c, 13c. However, the same phase connecting wires 14 may be formed on the same side as the phase-to-phase connecting wires 11c, 12c, 13c.

In the above embodiment, the coils C are divided into three phases, but the configuration is not limited to this. The coils C may be divided into n phases (n being a natural number greater then one).

In the above embodiment, the present invention is employed to connect the connecting wires 11c, 12c, 13c to each other. However, the use of the present invention is not limited to this. For example, present invention may be used to join the connecting wires 11c, 12c, 13c to other conductive members (for example, terminals). Alternatively, the present invention may be used to join the power lines 11a to 13b (the ends of lead wires forming the coils).

In the above embodiment, the connecting members 15 (or the holder 20) are not fixed to the stator core 6. However, the connecting members 15 (or the holder 20) may be fixed to the stator core 6. Each connecting member 15 (or the holder 20) is provided with projections, and grooves for receiving the projections are formed in the insulator of the stator core 6. The connecting members 15 (or the holder 20) is fixed to the stator core 6 by inserting each projection into the corresponding groove. This structure allows the connecting wires 11c, 12c, 13c (drawn wires) of the coils C to be easily welded and fixed, and improves the durability against external vibration.

Figure 16:
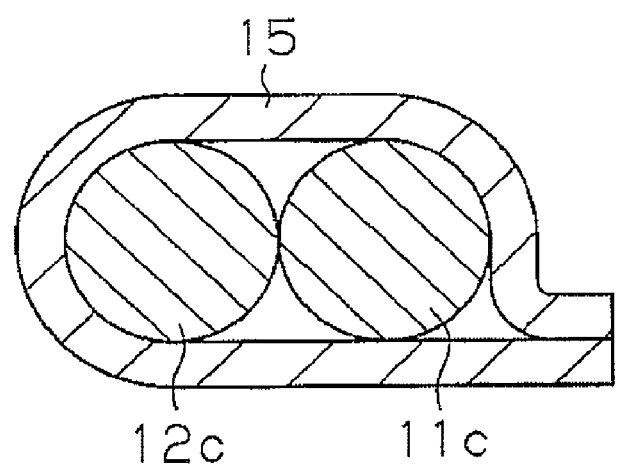
FIG. 16 is a diagrammatic cross-sectional view illustrating a connecting member according to a modified embodiment.

As shown in FIG. 16, each connecting member 15 may be formed to encompass the U-phase-to-V-phase connecting wire 11c and the V-phase-to-W-phase connecting wire 12c (or the W-phase-to-U-phase connecting wire 13c), which are arranged to contact each other. Each connecting member 15 electrically connects the U-phase-to-V-phase connecting wire 11c and the V-phase-to-W-phase connecting wire 12c (or the W-phase-to-U-phase connecting wire 13c), for example, by fusing.

Each connecting member 15 is a two-wire connecting member that connects the single U-phase-to-V-phase connecting wire 11c with the single V-phase-to-W-phase connecting wire 12c (or with W-phase-to-U-phase connecting wire 13c). However, the present invention is not limited to this. For example, each connecting member 15 may be three-wire connecting member. In this case, the V-phase-to-W-phase connecting wire 12c is bent, and a part of the connecting wire 12c that is drawn from the W-phase coil W4 and a part of the connecting wire 12c that is drawn from the V-phase coil V3 are arranged to overlap each other. These two wires and the U-phase-to-V-phase connecting wire 11c are connected together by the connecting member 15.

In the above embodiment, the connecting wires 11c, 12c, 13c are connected together by the connecting members 15 on the coils C. However, for example, the connecting wires 11c, 12c, 13c may be connected to connection terminals held by the holder member 5. In this configuration, the connecting wires 11c, 12c, 13c can be separated from the coils C. This improves the electrical insulation between the connecting wires 11c, 12c, 13c and the coils C.

What is claimed is:

1. A method for manufacturing a stator, the stator comprising:
   a stator core and a plurality of coils, wherein the stator core includes a plurality of split core pieces each having a tooth portion, the split core pieces being annularly arranged such that distal ends of the tooth portions face radially inward,
   wherein the coils are each wound about one of the tooth portions, the coils are divided into groups of n phases, the method comprising:
   winding a lead wire about each adjacent pair of the tooth portions with the tooth portions are spread such that the distal ends of the tooth portions are separated from on another, such that coils of different phases are provided on each adjacent pair of the tooth portions, wherein a connecting wire connects the coils of the different phases;
   making the spread stator core have an annular shape such that the distal ends of the tooth portions face radially inward; and
   connecting the connecting wires, each of which connects coils of different phases wound about circumferentially adjacent tooth portions, to each other.

2. The method according to claim 1, further comprising, when winding coils of different phases about circumferentially adjacent tooth portions, arching at least one of the connecting wires such that the connecting wire projects from an end face of the stator in the axial direction.

3. The method according to claim 1, wherein the coils include a U-phase coil, a V-phase coil, and a W-phase coil, and
   wherein the connecting wires include a U-phase-to-V-phase connecting wire connecting the U-phase coil and the V-phase coil, a V-phase-to-W-phase connecting wire connecting the V-phase coil and the W-phase coil, and a W-phase-to-U-phase connecting wire connecting the W-phase coil and the U-phase coil.

4. The method according to claim 3, further comprising, after making the spread stator core have an annular shape, forming at least one of the U-phase-to-V-phase connecting wire, the V-phase-to-W-phase connecting wire, and the W-phase-to-U-phase connecting wire into a ring extending along the circumferential direction of the stator.

5. The method according to claim 3, further comprising forming one of the U-phase-to-V-phase connecting wire, the V-phase-to-W-phase connecting wire, and the W-phase-to-U-phase connecting wire into a ring extending along the circumferential direction of the stator.

6. The method according to claim 3, further comprising, after making the spread stator core have an annular shape, arching at least one of the U-phase-to-V-phase connecting wire, the V-phase-to-W-phase connecting wire, and the W-phase-to-U-phase connecting wire such that the arched connecting wire extends along the circumferential direction of the stator.

7. The method according to claim 3, further comprising, after making the spread stator core have an annular shape, arching two of the U-phase-to-V-phase connecting wire, the V-phase-to-W-phase connecting wire, and the W-phase-to-U-phase connecting wire such that the arched connecting wires extend to the other connecting wire, and
   connecting the connecting wires to one another by a single connecting member when connecting the connecting wires, each of which connects coils of different phases wound about circumferentially adjacent tooth portions, to each other.

8. The method according to claim 1, further comprising:
   arranging wires drawn from the coils such that the drawn wires extend substantially parallel with an end face of the stator in the axial direction, and
   electrically connecting a part of each drawn wire that does not face said axial end face of the stator to the same part of another drawn wire or to another conductive member by laser welding.

9. The method according to claim 8, wherein each coil is a wire coated with an insulating coating film formed on the surface, each drawn wire being part of the coated wire, the method further comprising:
   electrically connecting each drawn wire to another drawn wire or to another conductive member after removing the coating film by radiating laser beam onto a part of the drawn wire that is opposite from said axial end face of the stator,
   wherein a joint portion is formed at a part of the drawn wire from which the coating film has been removed by said radiating of laser beam, wherein the drawn wire is welded to said another drawn wire or to said another conductive member at the joint portion.

* * * * *